Nov. 8, 1949   P. E. BESSIERE   2,487,416
ELECTRIC BRAKE, ESPECIALLY FOR AUTOMOBILE VEHICLES
Filed May 29, 1948
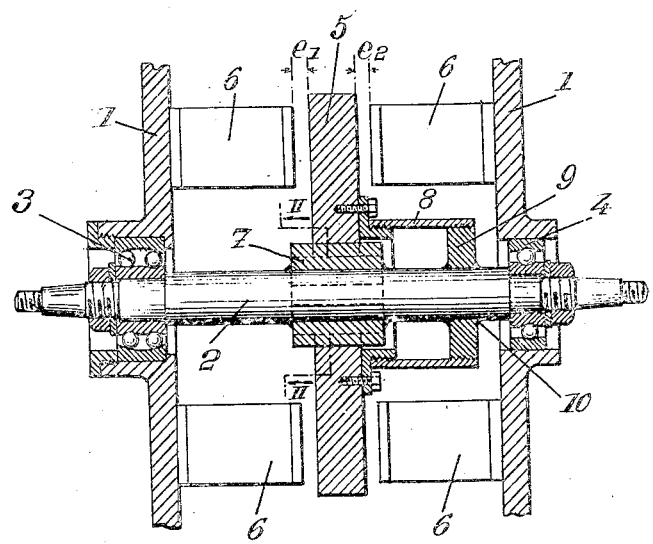
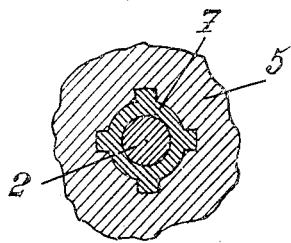

Patented Nov. 8, 1949

2,487,416

UNITED STATES PATENT OFFICE 2,487,416

ELECTRIC BRAKE, ESPECIALLY FOR AUTOMOBILE VEHICLES

Pierre Etienne Bessierè, Paris, France, assignor to Societe Electro-Mecanique de L'Aveyron S. A., Rodez, France, a society of France Application May 29, 1948, Serial No. 30,027
In France March 8, 1948

2 Claims. (Cl. 172—285)

1

The present invention relates to electric brakes, i. e. brakes in which a rotor, preferably of a magnetic metal, rotationally rigid with a shaft to be braked revolves in the magnetic field of electromagnets, the Foucault currents thus created in this rotor producing a braking effect. And it is more especially concerned with brakes of this kind for automobile vehicles.

Its chief object is to provide a brake of this kind which complies with the requirements of practice better than those used up to now for the same purposes.

It consists chiefly in making the rotor slidable on a main shaft only one end of which is fixed in the axial direction and in combining with this rotor compensating means responsive to thermal expansion to produce relative axial displacements of said rotor with respect to said main shaft, said compensating means being arranged so that the direction and amplitude of the relative axial displacements of the rotor when the brake is hot keep the air gaps thereof at substantially constant values.

Preferred embodiments of the present invention will be hereinafter described with reference to the accompanying drawings, given merely by way of example and in which:

Fig. 1 of this drawing diagrammatically shows, in axial section with parts cut away, an electric brake for an automobile vehicle, this brake being made according to the invention;

Fig. 2 is a section on the line II—II of Fig. 1.

The brake includes a frame constituted, for instance, by two side plates 1 connected together by a cylindrical wall (not shown), these side plates acting as a support for a shaft 2 abutted only one of the ends of which is fixed in the axial direction, for instance by means of a thrust bearing 3 fixed in the corresponding side plate 1 while the other bearing 4 can slide in the side plate 1 by which it is supported when shaft 2 expands under the effect of heat.

I mount on shaft 2, in a manner which will be more explicitly explained hereinafter, a rotor 5 made of a magnetic metal, said rotor being preferably constituted by a soft iron disc.

I further fix on side plates 1, on either side of rotor 5, a plurality of electro-magnets 6 the polarities of which are such that they create, inside said rotor, when said electro-magnets are energized by an electric current, Foucault currents which exert an efficient braking action upon rotor 5.

Obviously these Foucault currents will cause an intensive heating of rotor 5 and of shaft 2.

2

This shaft will therefore expand and this expansion would of course vary the values of air gaps $e_1$, $e_2$ if rotor 5 were secured in fixed position on shaft 2, due to the fact that one end of said shaft 2 is held by ball bearing 3, while the other end can expand freely by sliding of bearing 4.

If it were desired to obtain a correct value of air gaps $e_1$ and $e_2$ in operation (air gap $e_1$ should be as approximately equal as possible to air gap $e_2$) it would therefore be necessary to provide, in the cold state, for a value of air gap $e_1$ substantially smaller than that of air gap $e_2$.

This solution would be disadvantageous because thrust bearing 3 would have to support, in the cold state, a thrust due to the difference of attraction exerted on rotor 5 by the sets of electromagnets disposed respectively on either side of said rotor. It would therefore be necessary to provide a big thrust bearing.

In order to remedy this drawback and according to my invention, rotor 5 is slidable axially with respect to shaft 2, while remaining rotationally rigid therewith, for which purpose for instance I interpose, between said rotor and said shaft, a ribbed sleeve 7, rigid with shaft 2, whereby rotor 5 can be moved in a direction parallel to the generatrices of this sleeve. This rotor is fitted with compensating means acting in response to thermal expansion when the brake is heated to produce relative axial displacements of rotor 5 with respect to shaft 2, these compensating means being so arranged that the direction and amplitude of the relative axial displacements undergone by the rotor during the period of heating of the device keeps air gaps $e_1$ and $e_2$ at substantially constant values.

Preferably, air gap $e_1$ will be always smaller than air gap $e_2$ but as close as possible thereto.

For this purpose, the above mentioned compensating means can advantageously be constituted by a thermally expansible piece interposed between sliding rotor 5 and an abutment fixed to shaft 2 on the side thereof where it can expand freely.

Thus, for instance, I may fix on the face of rotor 5 that is turned toward bearing 4 a sleeve 8 coaxial with shaft 2, the end of said sleeve opposed to said rotor being fixed to an annular disc 9 itself fixed to shaft 2, for instance by welds 10.

The operation of such a device is then as follows:

A rise of the brake temperature causes an expansion of shaft 2 which has a tendency to move disc 9 toward the side plate 1 that carries bearing 4. However this expansion is compensated by the expansion of sleeve 8, which urges rotor 5 toward the side plate that supports thrust bearing 3.

If the characteristics of sleeve 8 (nature of the constituent metal, section, area of contact with rotor 5, etc.) have been suitably chosen, it is possible to obtain, during the period of heating of the brake, an axial stabilization of rotor 5 in a position such that air gaps $e_1$ and $e_2$ comply with the above stated conditions.

It should be noted that it will be of interest to make sleeve 8 of a metal having a coefficient of expansion higher than that of shaft 2, for instance of copper, in order to make allowance for the fact that shaft 2 (the expansion of which takes place in the direction of bearing 4) is of a much greater length than sleeve 8 (the expansion of which tends to take place in the direction of bearing 3).

It will also be necessary carefully to determine, either by calculation, or experimentally, the optimum section of contact to be provided between rotor 5 and sleeve 7, this section obviously having a preponderating influence on the amount of heat received directly by said sleeve from rotor 5 and, therefore, upon the importance of the compensating effect.

It should be noted that sleeve 8 will have a tendency, due to the position it occupies with respect to rotor 5, to heat up more rapidly than shaft 2. Now, it is important to prevent a premature heating of this sleeve from temporarily impairing the proper positioning of rotor 5, which would then be subjected to a preponderating attraction from the electro-magnets 6 located on the side of thrust bearing 3.

In order to avoid such an eventuality, it will be possible to make use of the various factors which determine the velocity of propagation of heat through sleeve 8, and, in particular, the section of this sleeve, which section may eventually vary from one end to the other of the sleeve.

Of course, I may consider many other embodiments of the compensating means and, in particular, substitute for disc 9 a nut capable of cooperating freely with rotor 5 to produce axial displacements thereof, said nut being connected with said rotor through an expansible element adapted to undergo rotary displacements insuring rotation of the nut and therefore suitable relative displacements of rotor 5.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electric brake which comprises, in combination, a frame, a shaft journalled in said frame adapted to be coupled with a part to be braked, a metallic rotor carried by said shaft, electro-magnets carried by said frame on either side of said rotor for producing Foucault currents therein to exert the braking action, the end of said shaft located on one side of said rotor being fixed axially with respect to the frame in which it is journalled and the other end of said shaft being freely slidable in the axial direction with respect to said frame under the effect of thermal expansion, said rotor being slidable axially with respect to said shaft, and means interposed between said shaft and said rotor for compensating for the axial displacements of said rotor due to axial expansion of said shaft, to keep said rotor in substantially fixed position between said electro-magnets.

2. An electric brake which comprises, in combination, a frame, a shaft journalled in said frame adapted to be coupled with a part to be braked, a metallic rotor carried by said shaft, electro-magnets carried by said frame on either side of said rotor for producing Foucault currents therein to exert the braking action, the end of said shaft located on one side of said rotor being fixed axially with respect to the frame in which it is journalled and the other end of said shaft being freely slidable in the axial direction with respect to said frame under the effect of thermal expansion, said rotor being slidable axially with respect to said shaft, a sleeve of a thermally expansible material fixed at one end to said rotor and extending around said shaft toward the end thereof that is freely slidable in said frame and means for fixing the other end of said sleeve to said shaft for compensating for the axial displacements of said rotor due to axial expansion of said shaft, to keep said rotor in substantially fixed position between said electro-magnets.

PIERRE ETIENNE BESSIERÈ.

REFERENCES CITED

The following references are of record in the file of this patent:

UNITED STATES PATENTS

| Number | Name | Date |
|---|---|---|
| 2,199,024 | Carter et al. | Apr. 30, 1940 |
| 2,320,900 | Walz | June 1, 1943 |

FOREIGN PATENTS

| Number | Country | Date |
|---|---|---|
| 433,408 | Great Britain | Aug. 14, 1935 |
| 505,568 | Great Britain | May 12, 1939 |